United States Patent
Bar

(10) Patent No.: US 8,078,551 B2
(45) Date of Patent: Dec. 13, 2011

(54) DECISION-SUPPORT EXPERT SYSTEM AND METHODS FOR REAL-TIME EXPLOITATION OF DOCUMENTS IN NON-ENGLISH LANGUAGES

(75) Inventor: Shmuel Bar, Kochav Yair (IL)

(73) Assignee: Intuview Ltd., Kiryat Gat (IL)

( * ) Notice: Subject to any disclaimer, the term of this patent is extended or adjusted under 35 U.S.C. 154(b) by 901 days.

(21) Appl. No.: 11/991,002

(22) PCT Filed: Aug. 31, 2006

(86) PCT No.: PCT/IL2006/001017
§ 371 (c)(1),
(2), (4) Date: Feb. 26, 2008

(87) PCT Pub. No.: WO2007/026365
PCT Pub. Date: Mar. 8, 2007

(65) Prior Publication Data
US 2009/0157382 A1    Jun. 18, 2009

Related U.S. Application Data

(60) Provisional application No. 60/712,442, filed on Aug. 31, 2005.

(51) Int. Cl.
*G06F 11/00* (2006.01)
(52) U.S. Cl. ......................................................... 706/12
(58) Field of Classification Search .................. 704/231, 704/270; 706/12, 45, 62
See application file for complete search history.

(56) References Cited

U.S. PATENT DOCUMENTS

| 5,999,927 | A | 12/1999 | Tukey et al. |
| 6,675,159 | B1 * | 1/2004 | Lin et al. ............................... 1/1 |
| 2003/0046263 | A1 | 3/2003 | Castellanos et al. |
| 2004/0243645 | A1 * | 12/2004 | Broder et al. ................. 707/200 |
| 2005/0154690 | A1 * | 7/2005 | Nitta et al. ...................... 706/46 |
| 2006/0074980 | A1 * | 4/2006 | Sarkar ......................... 707/104.1 |

FOREIGN PATENT DOCUMENTS

EP    1 544 746    6/2005

OTHER PUBLICATIONS

International Search Report of Appplication No. PCT/IL06/01017 mailed on Jul. 8, 2008.
Alessandro Lenci et al: "Multilingual Summarization by Integrating Linguistic Resources in the MILS-MUSI Project" International Conference on Language Resources and Evaluation, XX, XX [Online] May 29, 2002, pp. 1-8, XP002504568. Wu C-W et al: "Ontology-based text summarization for business news articles" International Conference on Computers and their Applications. Proceedings of ISCA CATA, XX, XX, Mar. 26, 2003, pp. 389-392, XP002331152.
Neto J L et al: "Generating Text Summaries through the Relative Importance of Topics"[Online] 2000, pp. 300-309, XP002577464.
Chaves R P: "WordNet and Automated Text Summarization"[Online] 2001, pp. 1-8, XP002577465.
European Search Report of Application No. EP 06 78 0453 mailed on May 10, 2010.

* cited by examiner

*Primary Examiner* — David Vincent
(74) *Attorney, Agent, or Firm* — Pearl Cohen Zedek Latzer, LLP

(57) ABSTRACT

A method for real-time exploitation of documents in non-English languages includes processing an input document in into a processed input document, extracting ontology elements from the processed input document to obtain a document digest (DD), statistically scoring each DD to obtain a DD with category scores, refining the DD and the category scores to obtain a summary of each document in the form of a refined DD with refined category scores. The summary allows a user to estimate in real-time if the input document warrants added attention.

14 Claims, 9 Drawing Sheets

| Stem | Phonetic Transcription | POS Information | Translation | Semantic |
|---|---|---|---|---|
| كتاب | ki"ta:b | n. sing. | book | $Word |
| كتب | "kutub | n. pl. | books | $Word |
| تكفير | tak"fi:r | n. sing. | excommunication | $Excommunication |
| بغداد | baG"da:d | nm. | Baghdad | $Baghdad |
| دار الحرب | "dar al"Xarb | n. phrase | the territory of war | $DarAlxarb |

FIG. 2b

DECISION-SUPPORT EXPERT SYSTEM AND METHODS FOR REAL-TIME EXPLOITATION OF DOCUMENTS IN NON-ENGLISH LANGUAGES

CROSS-REFERENCE TO RELATED APPLICATIONS

This application is a National Phase Application of PCT International Application No. PCT/IL2006/001017, International Filing Date Aug. 31, 2006, entitled "Decision-Support Expert System And Methods For Real-Time Exploitation Of Documents In Non-English Languages", published on Mar. 8, 2007 as International Publication Number WO 2007/026365 claiming priority of U.S. 60/712,442 Patent Applications, entitled "Decision-Support Expert System And Methods For Real-Time Exploitation Of Documents In Non-English Languages", filed on Aug. 31, 2005, both of which are incorporated herein by reference in their entirety

FIELD OF THE INVENTION

The present invention relates generally to counter-terrorism (CT) systems and methods and more particularly to detection of potential terrorism and other security threats based on analysis of written texts.

BACKGROUND OF THE INVENTION

Tens of millions of non-English documents are seized each year in modern warfare and specifically in the global war on terrorism (GWOT). The challenge currently faced by Western intelligence agencies, militaries and law enforcement offices is the inability to rapidly extract and exploit information of high intelligence value contained in such captured documentation ("Document Exploitation" or DOCEX), whilst still in the field.

The current implementations of DOCEX require human translation and analysis of the content of each document before any operative action or conclusion is made. This process, which is performed at headquarters (HQ) and not in the field, is time consuming and suffers from several major deficiencies:

Extremely long processing time from seizure of documentation to completion of translation and analysis (translation backlogs of several months have been documented extensively in the media and in US congressional hearings), resulting in information of little operational value.

Intelligence analysis is never performed on documents in their original language or document format. Analysis is only performed on translations of the source documents. As such, essential clues as to the origin of the document such as font, document structure, and other contextual elements are overlooked and unexamined.

Even if the documents are translated in a timely manner, they may still be of little meaning to the end user. The frequent use of cultural and religious codes, references and allusions can only be recognized by a relevant expert with deep experience in the national or religious culture of the adversary.

More than 90% of documents captured remain unhandled due to the massive volumes collected.

Western intelligence agencies currently face significant shortages of qualified intelligence analysts and translators with relevant Middle Eastern expertise and proficiency in terrorism-related languages (Arabic, Pashto, Urdu, Persian).

Both the military and security organizations seek Near Real-time Exploitation (NRTE) capabilities, since such capabilities literally save lives. If intelligence information can immediately flow back to field units, the number of casualties will substantially be reduced:

On the battlefield, rapidly extracted information of high intelligence value will improve situational awareness and can more effectively direct forces to their targets.

In CT, real-time intelligence is invaluable, as it increases the ability to prevent potential terror attacks. Intelligence that arrives a little too late has no value.

SUMMARY OF THE INVENTION

The present invention relates to a decision-support expert system for real-time exploitation of documents in non-English languages for identifying and characterizing pre-defined types of documents and according them a priority rating. The system is an integrated multi-engine system which includes: a natural language engine, a statistical scoring engine, a rules engine, a summary engine and a knowledge base. The engines draw on the elaborate and constantly updated knowledge base of concepts, names, places etc. relevant to the requirements of Islamic terrorism. For example, these include formatting of the document as a lead (for example certain templates are typical of certain groups, fonts are characteristic), a Koran and Hadith-based verses knowledge base that "reads" verses according to the interpretation generally accepted by the identified entity behind the document.

By providing an immediate solution for the operative in the field, the system and methods eliminate the abovementioned obstacles by:

Immediately identifying any document that includes content related to Radical Islam, terrorism, or otherwise having intelligence value, and assigning it an unambiguous "Radical Islam" score.

Immediately producing a summary (also called 'Automated Intelligence Analysis') and a rationale behind category scores.

Alleviating the massive translation burden by significantly reducing the number of pages that require translation.

Enabling intelligence and law enforcement units to automatically analyze all captured documents without the need to pre-review and prioritize them Four different areas of expertise are brought together within the system:

i. Extensive knowledge of all aspects of radical Islam and Middle Eastern culture;

ii. A knowledge base that includes all relevant up-to-date information about the radical Islam world, including potential terror targets, historical and current events, terrorists and related organizations, etc;

iii. Extensive knowledge and experience in processing terror-related documents;

The underlying assumption is that translation may frequently be too late and the end-user may lack the cultural insight necessary to fully exploit the information hidden in the translated document. Therefore, the present invention does not provide automatic translation but rather automatic real-time first tier analysis—mainly geared for use in the field but also relevant to back office use and for triage of large amounts of soft documents.

Using the preset invention, an intelligence officer in the field or at HQ is able to peruse within minutes a large number of summaries or a mega-summary of the batch of documents or digital material apprehended (also referred to as "output", see e.g. FIG. 1) to see if this is material that warrants special attention. Exemplarily, the present invention addresses the "information glut" of Arabic language documents. The output may include:

A characterization of the document (according to its relevance to the terrorism requirement);

A threat-relevance rating;

Analyses of the significance of religious terms with terrorist ramifications.

Identification of names of persons, organizations and groups which are in the data base and information on those names (e.g. a Sheikh who permits suicide bombing etc.).

Transliteration and interpretation (possible family links etc.) of other names not in the knowledge base.

Translation of group numbers, addresses and place references.

Indirect links of the document to elements not mentioned in the document.

According to the present invention there is provided a method for real-time exploitation of documents in non-English languages including steps of: processing an input document into a processed input document; extracting ontology elements from the processed input document to obtain a document digest (DD); based on predefined categories, statistically scoring each DD to obtain a DD with associated category scores; using predefined rules, refining the DD and associated category scores to obtain a refined DD with associated category scores; and outputting a summary of the refined DD with associated category scores.

According to the present invention there is provided a method for real-time exploitation of documents in non-English languages including steps of: inputting a non-English text document; analyzing the non-English text; and based on the analysis, providing a summary of the text along with respective categorization.

According to the present invention there is provided a system for real-time exploitation of documents in non-English languages including: a natural language (NL) engine for receiving an input non-English text document and for outputting a DD, a Statistical Engine for processing the DD into a DD with associated category scores, a Rules Engine for refining the DD with associated category scores and for outputting a refined DD with associated category scores, a Summary Engine for generating an appropriate output in English or other requested natural language based on the refined DD with associated category scores, and a knowledge base for providing appropriate inputs to the processes carried out by the various engines.

BRIEF DESCRIPTION OF THE DRAWINGS

For a better understanding of the present invention and to show more clearly how it could be applied, reference will now be made, by way of example only, to the accompanying drawings in which:

FIG. 2b shows the structure of the lexicon through examples;

DETAILED DESCRIPTION OF THE INVENTION

The invention discloses a decision-support expert system for real-time exploitation of documents in non-English languages, for identifying and characterizing predefined types of documents. The system analyzes digital or physical non-English documents (for example in Arabic) that are suspected of possessing illegal, criminal or terrorist content, and immediately provides a summary that may be indicative of a threat. The following description uses Arabic solely as an exemplary language and "terror" solely as an exemplary threat, without restricting in any way the generality of the invention and its applicability for use with any other language or threats. As an example for a different use, the invention may also be used in detecting criminal activity by drug cartels corresponding on the Internet in Spanish.

Figure 1:
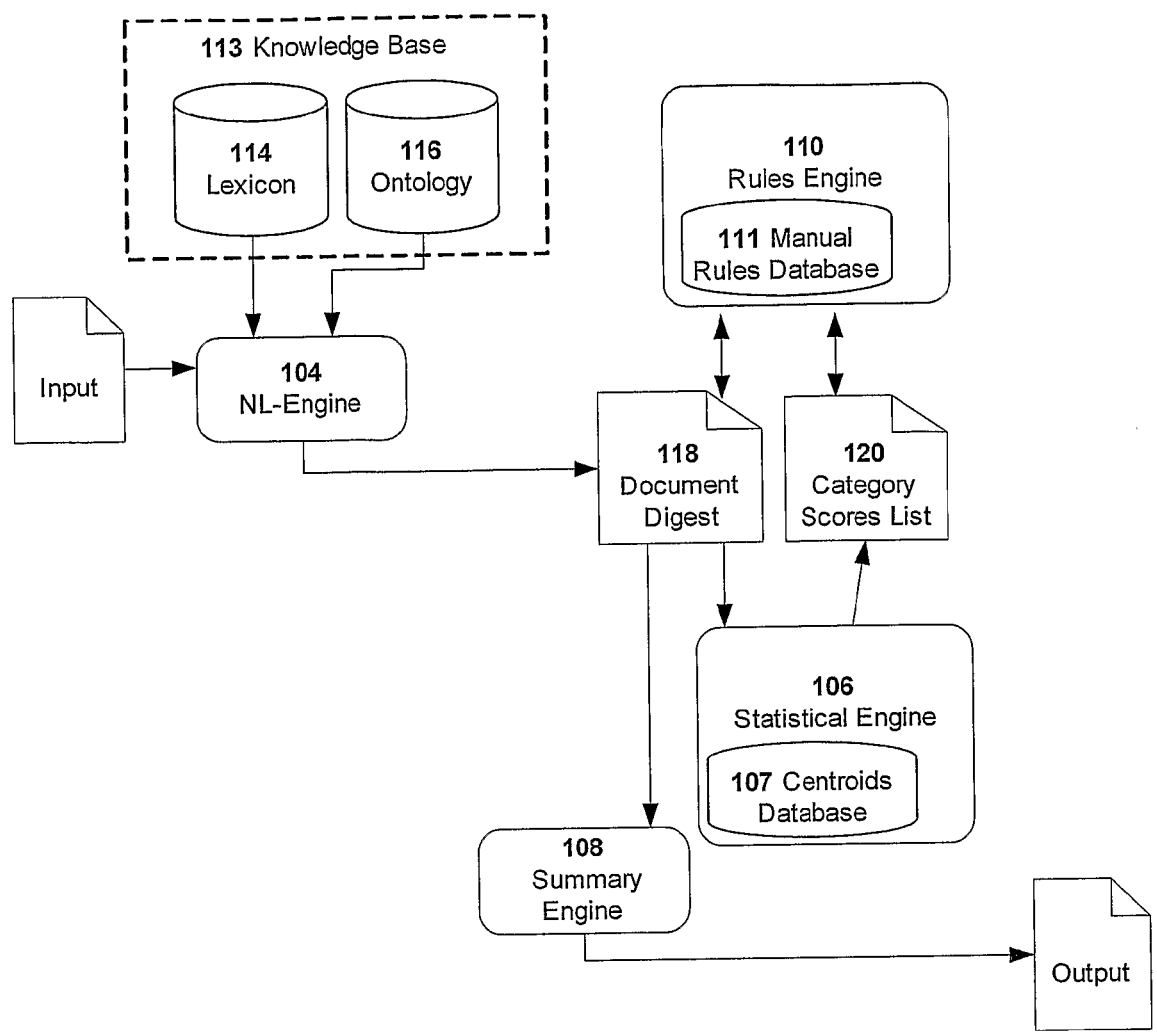
FIG. 1 shows an embodiment of the system of the present invention.

FIG. 1 shows a block diagram of an embodiment of a system 100 of the present invention. System 100 is used for text exploitation for the purpose of knowledge retrieval and includes a natural language (NL) Engine 104, a Statistical Engine 106, a Summary Engine 108, a Rules Engine 110, and a knowledge base 113 that includes a Lexicon 114 and an Ontology 116. Either or both of the knowledge base components may be collocated with the other system components (104-110) in the same physical enclosure, or be located remotely therefrom.

Lexicon 114, used by the NL Engine, is typically a large dictionary with all the Arabic (or any other supported language) words and other elements needed to be recognized for the purpose of the text exploitation process. Ontology 116 is a language-independent component of the system knowledge base and includes all the accumulated knowledge on lexicon entries in a hierarchical structure. The ontology includes elements such as "hot words" and "hot phrases", names, place names, quotes, logos etc.

NL Engine 104 handles input text on the morphological, syntax and semantic levels, and transforms an input document into a document digest (DD) 118. A document input to the NL Engine may be written in a predefined source-language such as Arabic, Farsi, Urdu, Malay, Pashtu, in digital formats such as PDF, EMAIL, Web Pages, Web Sites, MS Word and Plain text. The system input may also support hard copy scanning processed by external optical character recognition (OCR) software, in ways and means well known in the art. A DD is a special representation of an input document, typically in the form of a list containing all the ontology elements found in the document. Each entry in the list includes an instance and a placeholder of its location in the document, where the entries are sorted in the list by their order of appearance.

Statistical Engine 106 operates on the DD and decides whether the input document belongs to supported categories. A category is a decision domain, to which a document is matched or assigned by the system. For example, a basic category is Radical Islam. All the supported categories of the system, with a specific score of the input (and respective DD) document are listed in a category scores list 120 that preferably resides inside system 100. The Statistical Engine actions are based on statistical algorithms, such as centroid-based categorization, see below.

Rules Engine 110 refines (contributes an additional phase of knowledge enhancement to) the DD with category scores based on rules that try to imitate the human way of drawing conclusions and making decisions, and outputs a refined DD with refined category scores.

Summary Engine 108 uses a rules-based system on the refined DD with refined category scores and generates an appropriate output in English (or other requested natural language), according to DD 118 and category scores list 120.

Figure 2A:
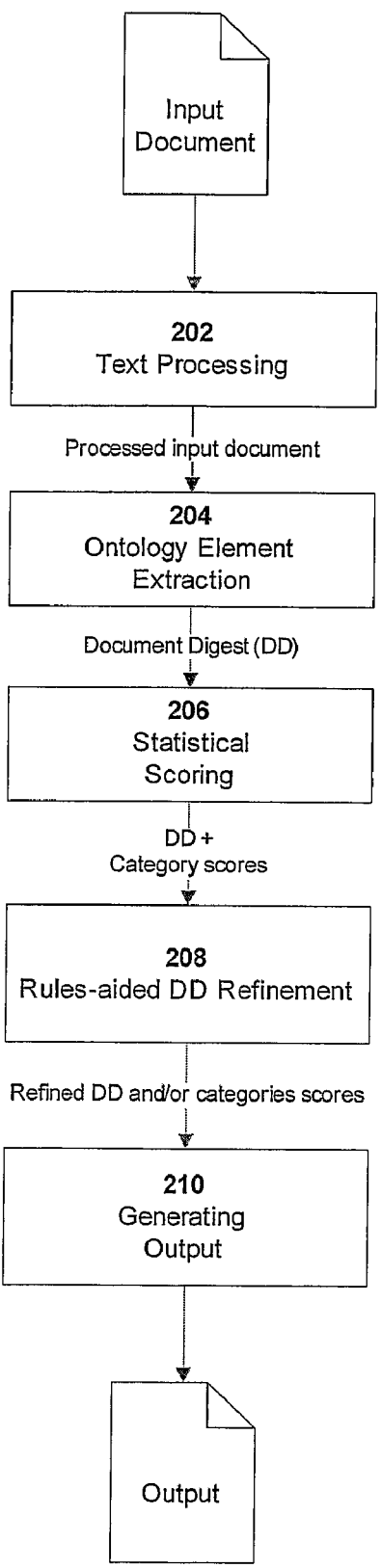
FIG. 2a shows the basic steps of a method of use involving the system of FIG. 1.

FIG. 2a shows the basic steps of a method of use involving system 100. First, the user defines the input document (or documents) he/she wishes to analyze. The system supports either digital format or hard format by converting digital formats to "txt" and by processing hard documents using existing OCR software. Batches of input documents may be defined so that the system analyzes them in parallel.

In a text processing step 202, the system identifies the language (or languages) in which each document is written, selects needed elements of the knowledge base and processes the document. The selected knowledge base elements (e.g. the language of the lexicon) depend of course on the input document language. The output of this step is a processed input document.

In an ontology element extraction step 204, the system examines the textual parts of the processed input document and extracts their ontology elements. This is preferably done using an analysis of the linguistic phenomena of the text, e.g. by morphological and syntax analysis. The output of this step is the DD.

In a statistical scoring step 206, a score is computed for each DD and/or DD batch for each defined category (the categories definition preferably done manually offline). The scoring is done based on the ontology elements extracted in step 204. The output is a DD with associated category scores. To emphasize, each DD has at least one associated category score. Typically, a DD will have a plurality of associated category scores. Note that these scores are also associated with the respective input document from which the DD is derived.

In a rules-aided DD refinement step 208, the system uses predefined rules to refine and/or extend the extracted ontology elements in the DD and associated category scores. In other words, the system infers new relevant elements using the input DD elements, imitating the way an expert analyzes a new text but using a larger pool of rules and the knowledge base. The output is a refined DD with associated category scores.

In an output generating step 210, the system outputs a summary of the analyzed document (i.e. the refined DD with associated category scores). The output may be hyperlinked (an HTML page) or in another form. In case of a batch of input documents, the system can output a separate HTML page per document, as well as a batch summary page that summarizes the inter-connection among the documents.

The main knowledge base components are described in more detail below.

The Knowledge Base

The knowledge base of the present invention is one of its key inventive features. The knowledge base is populated manually by the manufacturer and is kept updated on line. In addition, the system is customizable and allows users to add user-specific thesauruses under the categories defined by the manufacturer categories and to define custom categories.

The knowledge base is based initially on a manual expert analysis of a large number of documents in a variety of formats. The analysis covers characterization of the documents and of textual and graphic elements in the documents. Some elements of the analysis include:

Textual indicators—words, word-strings, idioms, phrases, and combinations and proximity of such characteristics to each other.

1. Names:

a) Personal names may be indicative of a national background. In some countries the last name may indicate the region, or even the city, where a person comes from.

b) Place names in a document may be indicative of the origin of the document. In certain contexts they may allude to a historic reference that can assist in determining the ideological tendency of the document (e.g. places where there have been incidents of political significance and may be mentioned in documents).

2. Titles and Honorifics. Honorifics and titles of religious or organizational seniority or political affiliation may also serve as indications of ethnic background or religious sect. Consider for example the following Muslim titles: Pir is indicative of a Pakistani-Afghani origin; Kaya, on the other hand is the Indonesian honorific for a Sheikh, Hujat al-Islam and Ayatollah are Persian titles; Murshid and Muraqib are indications of a link to the Muslim Brotherhood, and Amir is primarily used in Jihad type organizations.

3. Linguistic Conventions—greetings, usage of religious blessings etc. may also be indicative of sects, nationality, etc.

4. Dates:

Methods of writing dates and usage of different calendars (e.g., Gregorian, Jewish, Islamic) are indicative of the background of the author of the document. The knowledge base includes dates of important events and references to those events.

5. Terminology. Religious and political concepts are identified and classified as indications of a general or specific religious or political tendency, as means for identification of the origin of the writer of the document (e.g. common invocations added to the name of a prophet or God which differ in different sects). Some words used in documents often have dual meaning: besides their normal meaning, some words may be used in criminal jargon. In the context of a religious document or discussion of religious jurisprudence, they may have expanded or completely different connotations. The system identifies such words, and, according to their context, determines if they are likely to imply other than the conventional dictionary definition.

6. Quotations or Scriptural Verses—Political documents often quote ideological books or manifests, whereas religious texts tend to use common arguments based on chosen verses form the scriptures. The system identifies these quotations and verses and provides: commentary regarding their common use and common interpretation; characterization of a number of quotations and verses which are commonly used by certain movements as indicative of the general trend of the document. The system provides translations of the verses with commentary.

7. Names of specific individuals—The knowledge base includes names of living and deceased individuals, potentially indicating the inclination of the document. These names include: living and dead (including "historic") prominent political, regional or religious leaders, classified according to their political tendencies, i.e. radicalism or moderation; criminals and terrorists—both alive and dead—whose names may be mentioned in the texts of their followers (particularly deceased ones); short biographies of these individuals, describing their fields of activity, books the wrote, etc.

Visual indicators, which include:
   a) Text formatting including word processing templates, the physical layout of the document and font styles (indicative of the original language of the author of the text).
   b) Pictures, logos, diagrams, symbols and calligraphic icons Lexicon The lexicon is simply a large dictionary with all the Arabic (or any other language) words and other elements that one wants to recognize for the purpose of the tasks being performed. Arabic is a morphologically complex language. Like other Semitic languages, in Arabic the root is the basic form of a word. It may consist of 3 or 4 letters. Nouns and adjectives are formed by applying different patterns to each root. The result of such a combination (root+pattern) is called a stem. For example, applying the pattern فِعَال fEal to the root ك ت ب k.t.b create the stem كِتَاب ktAb (a book), and applying the pattern مَفْعَل mfEl to the same root create the stem مَكْتَب mktb (an office). Stems are treated (considered) as the smallest morpheme (unit of meaning), because in most cases, several stems from the same root have different meanings. An Arabic word may be composed of a stem plus affixes. The affixes include inflectional components for tense, gender, number, prepositions, conjunctions, determiners, possessive pronouns and pronouns. Those affixes can be attached to the beginning of a stem or to the end of a stem.

Since the basic unit of meaning is a stem, each entry in the lexicon includes the stem with additional information, namely the morphological (part of speech or "POS") information along with the phonetic transcription of the entry. The POS information is used by the NL-Engine, while the phonetic transcriptions are used to show transliterations in a Latin alphabet.

The lexicon includes each element of the language that needs to be handled by the system. It therefore includes:
   Words in their stem form, namely:
      Nouns and adjectives in the singular form; however, plural forms that cannot be obtained from the singular form by adding the ات At suffix are also listed in the lexicon.
      Verbs in the 3$^{rd}$ person singular of the past tense.
   Phrases, which are considered to have a "frozen" form.
   All ontology instances that are not Arabic words, namely:
      names, place names, names of organizations, weapons, etc.
   Citations from selected books—most important of course are the Qur'an and the Hadith. In this case the lexicon entry is a sentence fragment or an entire sentence (say a verse from the Qur'an).

FIG. 2 shows the structure of the lexicon through examples. The semantic column represents the mapping pointers to the ontology. Some of the entries can have more than one mapping so a special rule is also attached to the particular pointer to enable the resolution of such ambiguity when encountering this entry within a document. More details on rules are given below.

Ontology

The ontology is the language-independent component of the knowledge base and includes all the accumulated knowledge on lexicon entries in a structured manner. To simplify the presentation, a slightly simplified, tree-like ontology structure is introduced first. The details of the actual structure, which is a directed acyclic graph (DAG) are given after.

The basic ontology component is a node. Each node has a unique parent node, except for a single node that serves as the ontology root (defined below). A node may be an internal node, which has at least one child node, or a leaf if it has no children. In our particular case:
   Each leaf node corresponds to an instance entry. An instance may be, for example a:
      Word: In its stem form, as it appear in the lexicon.
      Phrase: Composed of several words and having a static form.
      Name: A person, a place, an organization, etc.
      Verse: From the Qur'an or from any other book.
   Each internal node represents a concept entry. A concept represents a set of instances (and perhaps of other concepts) having similar properties. In case a concept C is an ancestor of an instance B, B is a model of C. If C is an ancestor of another concept D, D refines C.

A concept defines a set of attributes (sometimes referred to as slots), where each attribute has a name and a type. In case a concept C defines a specific set of attributes, each instance that models this concept must provide values for the attributes defined by C. Moreover, when a concept D refines another concept C, it inherits its set of attributes and may define new attributes on top of them. Thus, each instance must fill all the attributes defined by its direct parent concept.

An attribute may be defined within a concept in one of the following manners:
   Fixed: The value of the attribute is set by the concept. Thus, every instance that models this concept must use this specific value to fill this attribute.
   Default: A default value of the attribute is given by the concept. Every instance that models this concept can either use this default value, or fill in an overriding attribute value.
   Empty: No value is set for the attribute. Each instance that models this concept must fill in a value of this attribute.
Note that a refining concept can also set a fixed value or a default value for a default or an empty attribute it inherits from a parent concept.

The tree root-node represents the $Thing concept (as a conversion, all concept names have a $ prefix), a meta-concept that all other instances can model. This concept is very general and defines some basic attributes.

Several concepts refine the $Thing meta-concept. Among these one can list: $Expression, $Person, $Place, $Organization, etc. Among the concepts refining $Person one can list $PoliticalLeader, $ReligiousLeader, etc. Once again, each concept can have instances that model it directly and sub-concepts that refine it.

Before continuing, here are a few examples that can help understand this hierarchical structure:

Two main concepts inherit from the $Place concept—$Country and $City.

The concept $Country defines an integral population field and other information fields one wishes to maintain. All country instances, such as "Israel" or "USA" must provide values for those fields. The Arabic lexicon entry إسرائيل AsrA<l (Israel) is associated with the instance "Israel", the lexicon entry الولايات المتحدة AlwlAyAt AlmtHdp (United States) is associated with the instance "USA", etc.

The concept $City defines a country attribute which is a reference to a model of the $Country concept. This attribute is naturally defined as an empty attribute. However, imagine that one has refined concepts such as $UK_City and $FranceCity, defining sets of cities in the United Kingdom and in France, respectively. $UK_City sets the country attribute with a reference to the instance "United Kingdom" and $FranceCity sets the same inherited attribute to refer to the instance "France". Note that "United Kingdom" and "France" are both models of the $Country concept.

The concept $PoliticaLeader, which refines the $Person concept, defines an empty positions attribute. The value for this attribute is a list of records, where each record is comprised of a start_date (a Date value), an end_date (a Date value) and a description (a String value describing the role this person filled during the relevant period). This attribute will help us deduce when the analyzed document was written.

Figure 3:
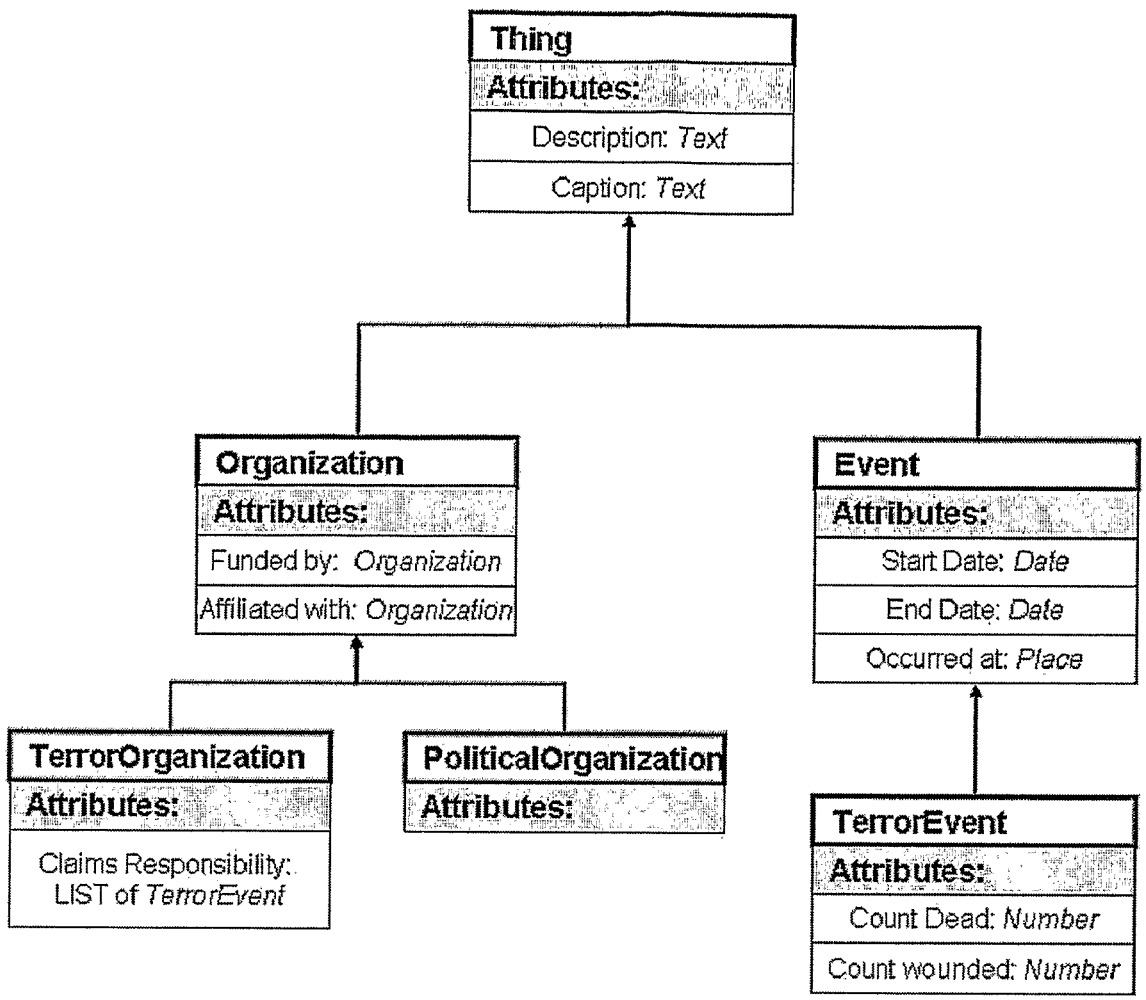
FIG. 3 shows the ontology structure used in the system of the present invention, where arrows correspond to refinement relations between concepts.

FIG. 3 presents part of suggested ontology, including the $Organization and the $Event concepts that refines the root concept $Thing. The concepts $TerrorOrganization and $PoliticalOrganization both refine the concept $Organization, so the concept $TerrorOrganization includes the attribute claims_responsibility, which is a list of reference to $Event instances, and also the attributes funded_by and affiliated_with, which are inherited from its parent concept. The attribute claims_responsibility is the only direct attribute (declared by the concept $TerrorOrganization). Other, non-direct attributes which were inherited from the parent concepts are also shown. In the same way, $PoliticalOrganization does not contain any direct attributes but it still includes the inherited attributes funded_by and affiliated_with. $TerrorEvent refines the concept $Event and includes the direct attributes count_dead and count_wounded along with the inherited attributes from $Event: start_date, end_date, occurred_at.

Instances can now be created from these concepts. For example, one can create the instance "Islamic Jihad" which models the concept $TerrorOrganization and the instance "Tel Aviv Line 5 terror attack" which is an instance of the concept $TerrorEvent. The latter instance can then be related to the attribute claims_responsibility of the instance "Islamic Jihad".

The use of the ontology helps one search for closely related concepts in a document. For example, if users are interested in documents that mention the name of a specific organization, one should be able to identify documents that mention only prominent members of the organization, or events this organization was involved in. The next sections explain the techniques used to data-mine the input document using the ontology.

Ontology with a Directed Acyclic Graph (DAG) Structure

So far, each node in the ontology was defined as having a unique parent, resulting in a tree structure for the entire ontology. However, each node (except the $Thing concept) is actually allowed to have more than one parent: namely a concept may refine several concepts and an instance can be a model of several concepts. As a result, the inventive ontology disclosed herein has a structure of a DAG.

When an instance models several concepts, it needs to fill the attributes it inherits from all these concepts. For example, there are instances of the $PoliticalLeader concept, mentioned above, which have also written books, so they are also models of the $Author concept. Both these concepts are models of the $Person concept, so attributes like date_of_birth and date_of_death are inherited from this common ancestor. The positions attribute is inherited from $PoliticalLeader, while the books attribute is inherited from $Author.

A common child to two (or more) concepts is not allowed definition if these concepts contradict, namely:

The two concepts define an attribute of the same name.
Each of the two concepts gives a separate fixed value to some attribute inherited from some common ancestor, and these two values are not equal. Note that if both concepts give a default value to the attribute, these default values are ignored if they are not equal.

Relations Between the Lexicon and the Ontology

Hereinabove, it was shown that each lexicon entry has a semantic mapping, which is a reference to an ontology node. An example of names of countries and organizations that are associated with instances was also given above. This simple relation between a lexicon entry and an ontology instance is typical for lexicon entries that represent names (of places, persons, etc.). However, there exist other possibilities:

Lexicon entries may be mapped to a concept that has some added significance. For example, there are expressions used only in Sunni terminology and others used only in Shiite religious documents. Such expression entries are consequently mapped to the concepts $IslamicSunniExpression or $IslamicShiiteExpression, both refining the concept $Expression.

It is possible that several lexicon entries refer to the same instance. For example, the entries "Yasser Arafat" and "Abu 'Amar" both refer to the ontology instance "Yasser Arafat". This instance also stores the facts known about Arafat in its attributes: his date of birth, date of death, links to the "PLO" instance etc.

The semantics of a lexicon entry may be ambiguous, so it can be associated with several ontology nodes. For example, the entry "Qatar" should obviously be associated with the instance "Qatar", which is a model of $Country. However, the same word can be read as /qutr/, meaning a district—thus, a reference for the $Expression concept to the semantic mapping of this entry is also added.

The following describes in more detail the functions and actions of the main elements of system 100, as well as providing more details of the main steps in FIG. 2a.

The NL-Engine

Figure 4:
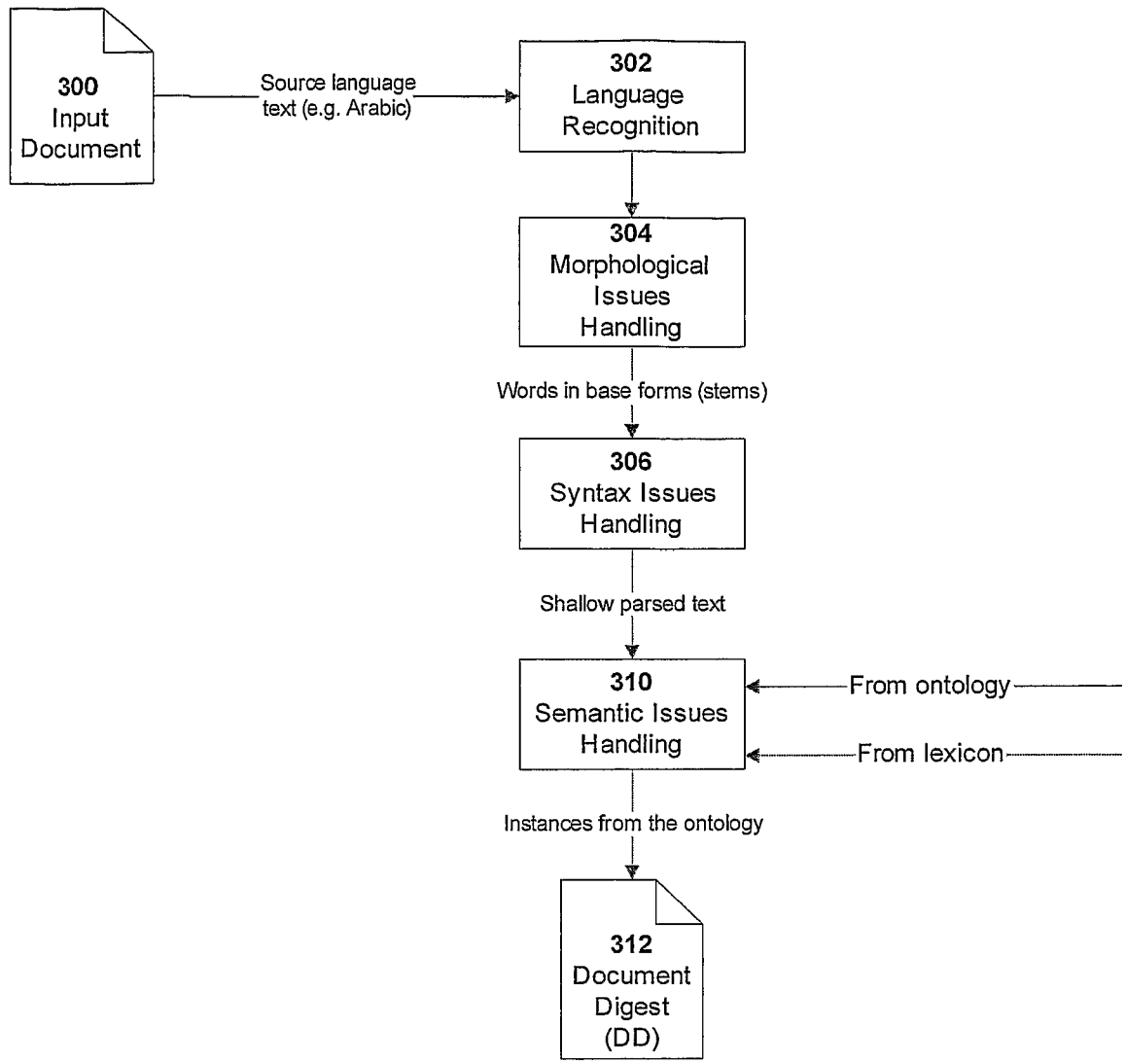
FIG. 4 shows the Natural Language (NL) engine flow chart.

The NL Engine transforms an input document into a special representation—the DD. It analyzes the text with a natural language processing tool in several layers. Since the NL Engine deals with issues regarding a language, it is a language-dependent component. The following describes an NL Engine for the Arabic language. FIG. 4 explains the functioning of the NL Engine, in substeps that combine to form text processing step 202 and ontology element extraction step 204.

A document is input to the NL Engine in step 300. The text of the document is processed in a language recognition step 302, to identify the language of the input document according to the following characteristics 1. Alphabet (Latin, Cyrillic, Arabic, etc.). In some cases (e.g., Hebrew or Korean) the alphabet uniquely determines the language.

2. Unique or typical diacritics. For example, when occurring in a text written in the Latin alphabet, the letter ñ can indicate the text is written in Spanish, while the letter ł can indicate that the text is Polish. Similarly, when the alphabet used in Arabic, the letters ڤ چ پ are indicative of Persian or Urdu.

3. Frequency analysis of letter combinations. The distribution of monographs and bi-graphs is a well-known characteristic of a language, and can be used to determine the language of the text, even if one needs to distinguish between two languages that have exactly the same alphabet, with no typical diacritics. Consider for example English and Dutch: the bi-graphs ea and th are very common in English but rare in Dutch, while the bi-graphs oe, ij and uu are common in Dutch but are almost impossible in English.

Having identified the language of the document, it is still necessary to identify its origin more precisely. This is possible by examining some additional characteristics of the document:

1. Language/dialect specific words. For example, the word huitante for eighty is indicative of Swiss French (as opposed to quatre-vingt in all other French speaking countries).

2. Combinations indicative of transliteration of languages into non-indigenous alphabets. Transliteration of Arabic text into Roman alphabet may reveal the dialect of the pronounced—as opposed to the literary—text due to dialect-specific vocalization. For example the name Qaddafi would be transliterated in certain dialects Gazafi.

3. Forms for writing dates, numbers or acronyms.

Stemming (extracting the stem out of a specific word) is next performed in a morphological issues handling step 304 for the specific identified language. Examplarily, the NL Engine may perform stemming in a similar way to the Buckwalter Analyzer, see Tim Buckwalter, "Arabic Morphological Analyzer Version 1.0", Linguistic Data Consortium, University of Pennsylvania, 2002. LDC Catalog No.: LDC2002L49.

Stems output in step 304 are shallow parsed in a syntax issues handling step 306. A first task here is to identify the boundaries of the sentences, done using punctuation marks. Each word's part-of-speech role (Noun, Verb, Adjective etc.) is then found, for example using the SVMPOS tool described in Mona Diab, Kadri Hacioglu, and Daniel Jurafsky, "Automatic tagging of Arabic text: from raw text to base phrase chunks". Proceedings of NAACL-HLT, 2004. Shallow parsing is performed on a sentence with identified part-of-speech roles for each word. Shallow parsing is the process of finding the basic phrases (Noun-Phrases, Adjective-Phrases, Verb-Phrases and Adverb-Phrases) of the sentence. A basic phrase is a phrase which is not composed of other phrases (non-recursive). A detailed description on Arabic shallow parsing can be found in Mona Diab et al. above.

A meaningful structure of some words in the text is then obtained in a semantic issues handling step 308. Note that the inputs from the Lexicon and Ontology into the NL Engine shown in FIG. 1 are processed in this step. Finally, all found ontology instances within the document are inserted to an internal representation of the document for the purposes of our exploitation process to produce a DD output in step 310. The other engines then work on the DD instead of working on the input document. Advantageously, the language-independent nature of the DD allows building of the other engines also as language-independent elements. This situation dramatically reduces the set-up time of supporting another language.

Returning briefly to the semantic issues handling step 308, it was mentioned above that an ontology element (instance or concept) represents a meaning of some idea Lexicon entries have mapping pointers to those elements, so by finding lexicon entries (Arabic words or phrases) within the document, one can extract the mapping to those elements. Usually there is more than one mapping for each lexicon entry, and sometimes lexicon entries depend on other lexicon entries to form a meaningful and relevant element, so special care should be taken in order to deal with such situations.

Depending on previous tasks (e.g. shallow parsing), the meaningful structure is obtained using a set of manually written rules. This is performed as a loop—existing rules are applied until no further rules can be applied.

The following illustrates the procedure on a simple example in English. Assume that our English lexicon includes the following entries:

| Stem | POS | Semantic |
|------|-----|----------|
| carry | v. | $Carry |
| passport | n. | $Document |
| brother | n. | $Human |

Among the rules defined for this step is the following one:

```
<template>
    <comp type="$Human" role="AGENT" />
    <comp type="$ActionVerb" role="ACTION" />
    <comp type="$Thing" role="THEME" />
</template>
```

This rule means that one looks for a text fragment that describes a human (any model of the $Human concept in the ontology) that performs an action (represented by a verb that models the $ActionVerb concept) on something (a model of $Thing, which basically can be anything). Now consider the following text, taken from a training manual published by Al-Qaeda and found in Manchester (UK) by the police during a search of the house of an Al-Qaeda member:

"When a brother is carrying the forged passport of a certain country, he should not travel to that country. It is easy to detect forgery at the airport, and the dialect of the brother is different from that of the people from that country."

By shallow parsing the first sentence one gets (NP—noun phrase, VP—verb phrase, PP—prepositional phrase):

When [a brother NP] [is carrying VP] [the forged passport NP] of [a certain country NP], [he NP] [should not travel VP] [to PP] [that country NP]

Next, the lexicon is used to associate semantic tags (ontology references) to the words in each phrase. For example, the phrase a brother is assigned with the tag $Human, is carrying is assigned with the tag $Carry and the forged passport is assigned with $Document. Having done so, the NL Engine tries to match sequences of tags to the one of it template rules. In this case, one has a sequence of $Human, $Carry (which is a descendent of $ActionVerb in the ontology) and $Document (which is of course a descendent of $Thing). Thus, the template rule above can be applied, resulting in the following meaning:

```
<meaning>
    <AGENT type="$Human" lex="a brother" />
    <ACTION type="$Carry" lex="is carrying" tense="pres. part." />
    <THEME type="$Document" lex="the forged passport" />
</meaning>
```

Now, for example, if the rule was not innocent (i.e. with some terror threat level) like here, and the component <comp type="$Thing" role="THEME"/> is replaced with <comp type="$Explosive" role="THEME"/>, then step 310 is able to capture patterns of "someone doing something with explosive stuff".

Finally, in the semantic issues handling step, for each rule there is a section of actions. This section includes the actions that the expert should perform if this rule was applied. In this example, the action is "adding new instance of the $ActionVerb that was captured to the DD, and filling the instance with the appropriate theme—the found instance of $Explosive, and the found agent".

Step 308 also performs named entity resolution (NER) by existing statistical methods. As used herein, NER is the task of finding names of places, persons and dates. Special care is taken for names of persons in order to find relevant names that still are not on the ontology. This task is performed considering the following rules for Arabic names:

1. "ism 'alami" (also known as "ism" or "alami")—a single personal name (corresponding to the Western "first name" or "Christian Name", as Muhammad (Mohammed), Musa (Moses), Ibrahim (Abraham), Hasan, Ahmad. A name with the prefix 'Abd al- will take on of the 99 names of Allah. However not all the names are used in composing human names (e.g. names indicating negative aspects of God such as Mumit (the killer etc.). A personal name may be preceded or succeeded by the name Mohammad or another of the names of the Prophet. This is not a name used by the individual (he will not be called Mohammad if this is only an additional name), but will appear in official documents. It is common for a person to be named after his grandfather, so cousins will frequently bear the same "ism".
2. 'Ism 'aaela" or "Family name"—The surname may or may not be composed with the article al-.
3. Nasab, a patronymic or pedigree, as the son or daughter of a certain one, e.g., ibn 'Umar [the son of Omar], bint 'Abbas [the daughter of 'Abbas]. The nasab is always a patronymic, the <son or daughter> of <father's name>. Sometimes the nasab will not include the word "ibn" but the father's name will come directly after the proper name (ism). thus two brothers may have the same "second name". The grandfather's name may also be added as a third name.
4. A Lakab, a combination of words into a cognomen or epithet, may follow the name or the surname. It may refer to a physical quality which the bearer has (or may like to have): al-Tawil (the tall), etc. Traditionally, Muslims also used "laqab" with religious conotations.
5. An occupational Nisba, derived from a person's trade or profession, e.g., Muhammad al-Hallaj (Mohammed the dresser of cotton). Many occupational names are preserved as surnames (as in the West): Hadad (Blacksmith), 'Ayash (Baker), Laham (butcher), Najar (Carpenter).
6. A geographical Nisba, derived from the place of residence or birth or his tribe, e.g., Hasan al-Baghdadi (Hasan of Baghdad), Faiz al-Huweitat (Faiz of the Huweitat tribe)
7. A Kunya, an honorific name, as the father or mother of certain persons (usually the eldest son), e.g., abu Da'ud [the father of David], umm Salim (the mother of Salim]. Married ladies are, as a general rule, simply called after the name of their first son, e.g., umm Ahmad (the mother of Ahmad).
8. A Social or religious honorifics—a name may be preceded by an honorific such as Shaikh, Ustadh, etc (see list of honorifics and their cultural/geographic context).

A full Arabic name may include the following: first name (ism 'alami), patronymic, paternal grandfather's name, family name (ism 'aila) and options of a geographical or other nisba. Alternatively a name may be a Kunya or Nasab.

Step 308 identifies names in a string in the processed input document and compares them to ontology name instances in the system, thus identifying possible relations between relevant ontology instances and previously unidentified alternative names. For example, Yousuf Abdallah Yousuf Nassif al-Wazir is the eldest son of Abdallah (hence has his grandfathers name as a first name) and he has a son named Abdallah after his father Abdallah and a third name of his grandfather. Therefore he may be called Abu Abdallah (automatically) and his brother may be X Abdallah Yousuf Nassif al-Wazir) and his cousin may be X Y Yousuf Nassif al-Wazir, etc.

The Statistical Engine

Given a document, a user may wish to automatically determine whether the text includes a term related to any supported category. Assume that the main category is "Radical Islam" and that there are more categories such as "Explosives", "Finance" etc. The output of this engine is a decision on each category relevancy with a confidence score. For example, the engine gives a category score of 90% to "Radical Islam" with a confidence score of 70%, meaning that the document is relevant to Radical Islam, but the confidence in this decision is not extremely hig. Exemplarily, the methodology used herein is the Centroid-based methodology, known from the Text Categorization field (more on Centroid-based Text Categorization can be found in the article "Centroid-Based Document Classification: Analysis & Experimental Results" by Eui-Hong (Sam) Han and George Karypis, In European Conference on Principles of Data Mining and Knowledge Discovery (PKDD), 2000. However, the features used are the instances found by the NL Engine and placed in the DD and not the words themselves.

The Statistical Engine operates in two different modes. The first mode is called training, which is an offline process of learning the centroid of each category. The second mode is called testing, which is the process of talking a plurality of new DDs and outputting the relevance categories with confidence scores.

Figure 5:
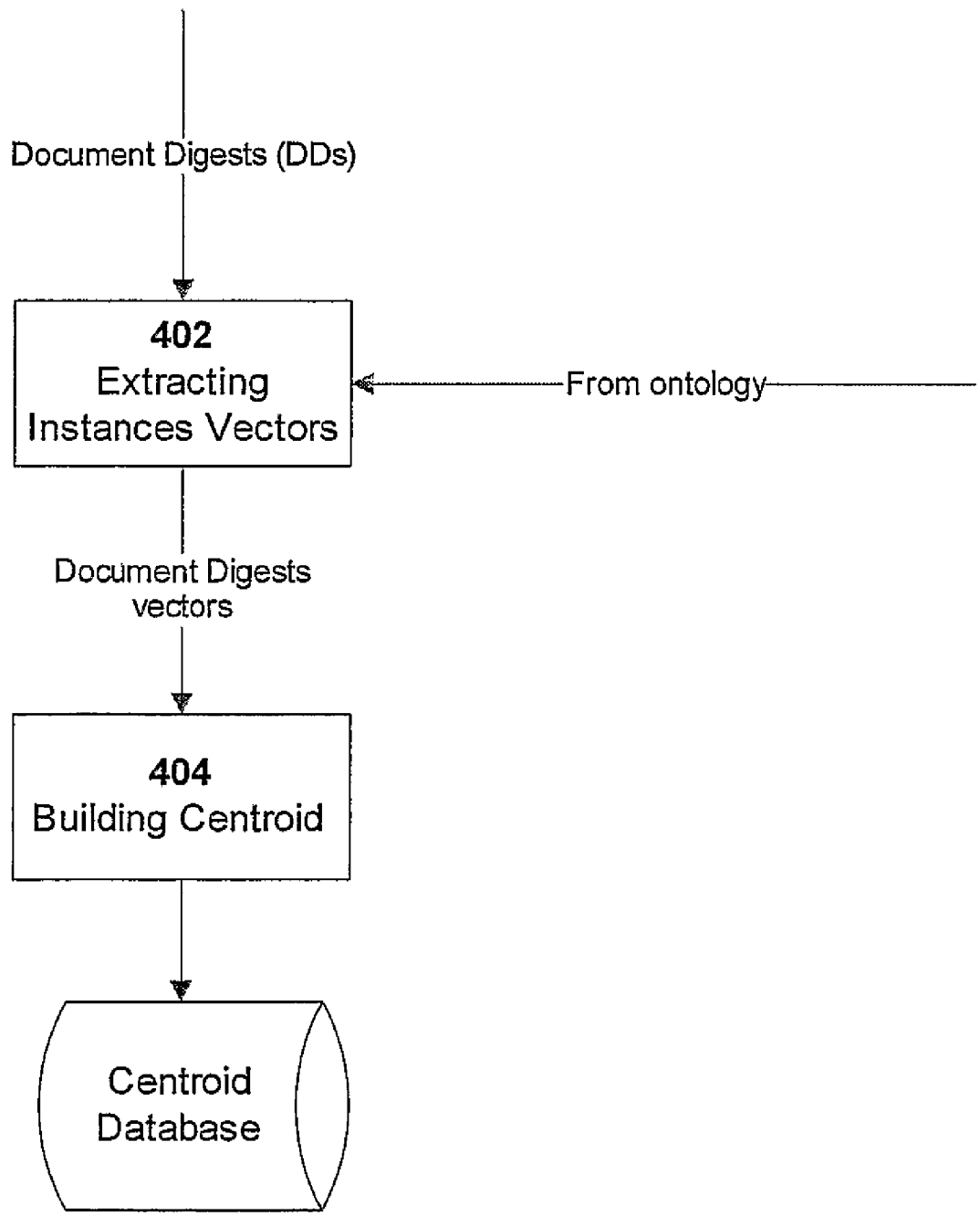
FIG. 5 shows the main steps on the training mode in the Statistical Engine.

FIG. 5 shows the main steps on the training mode. Assume Radical Islam to be an examplary category. A document in the training set is (manually) categorized by its Islam. Radicalism in the range 1-9, with 1 for moderate and 9 for radical. Each element in the ontology is also manually assigned by the same range. The Statistical Engine uses a large amount of documents in order to build the requested centroids. The documents are first processed by the NL Engine to create their correspond DDs. The DDs are input to the training mode and are processed to extract instances vectors in step 402. Each DD is considered to be a vector in the ontology elements space. The i-th cell of the vector represents some element from the ontology (concept or instance) through the value of its tf*idf. The tf*/idf (Term Frequency*Inverse Document Frequency) is calculated in the following way:

tf—the number of times that the specific element appears in the document.

idf—it is actually $\log(N/df)$ where N is the number of documents in the training-set and df is the number of documents in training-set that includes this ontology element.

tf*idf is the multiplication of tf and idf of the specific ontology element.

Each vector is then normalized so that it is of the unit length, i.e. $\|v\|=1$. The vectors are then multiplied by the (expert) manually given of the documents they represent. Finally, DD vectors are used to build centroids and push them to the centroid database in step 404, see below.

Instances found in the DD also affect their parent concepts in the way that they increment their frequencies as if the concept itself was found in the document. This is correct thanks to the hierarchical structure of the entire knowledge base. The centroids are built as follows: given a set S of DDs and their vectors, the centroid vector C of the set is defined as $$C = \frac{1}{|S|} \sum_{v \in S} v$$

This is actually the average vector of the vectors set. The similarity between a document vector and a centroid is computed using the cosine function:

$$sim(v, C) = \frac{v \cdot C}{\|v\| * \|C\|} = \frac{v \cdot C}{\|C\|}$$

(since $\|v\|=1$). A centroid is built for each category and stored in a database. The process moves now to the testing mode.

Figure 6:
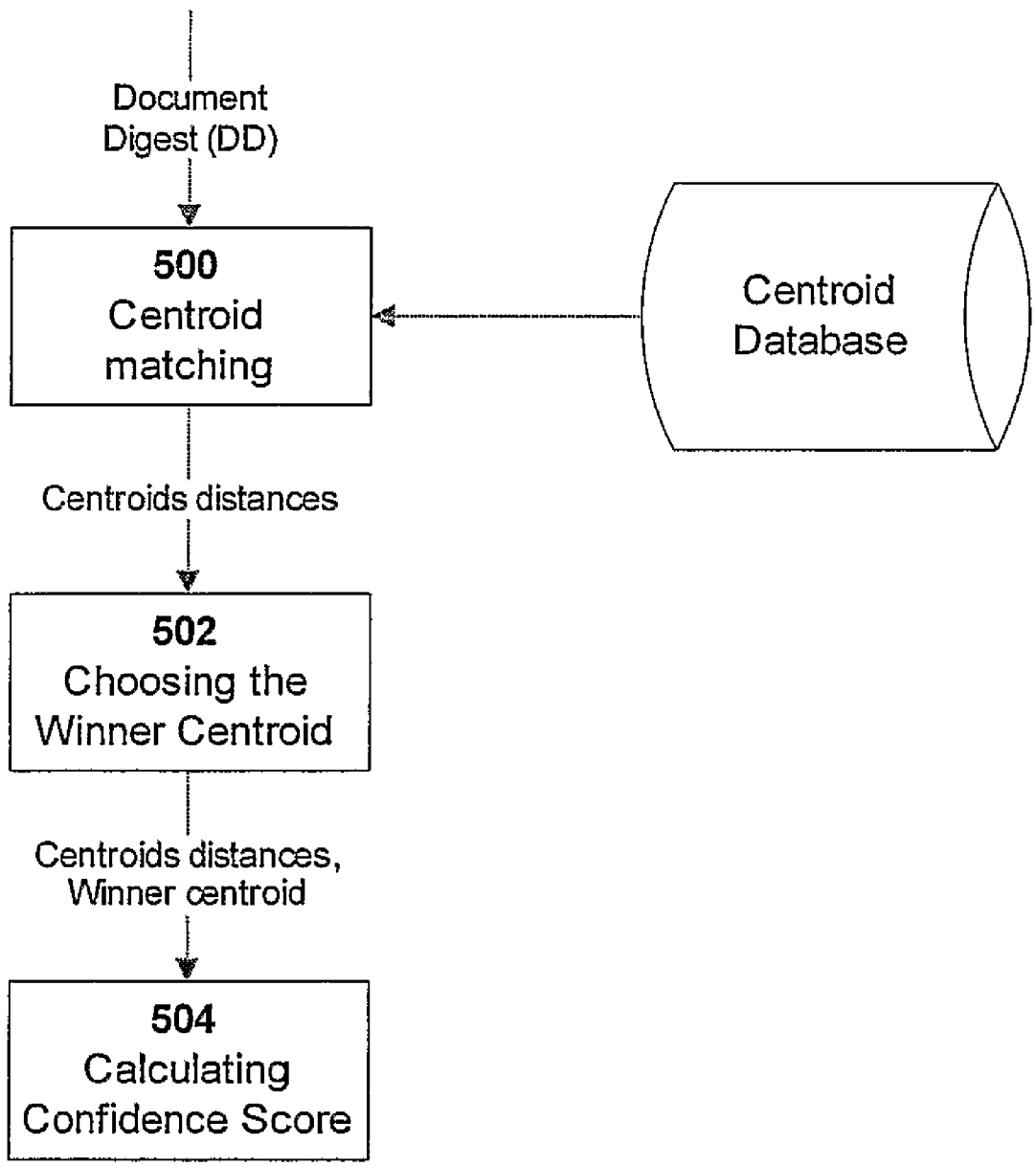
FIG. 6 shows the main steps on the testing mode in the Statistical Engine.

FIG. 6 shows the main steps on the testing mode in the Statistical Engine. In essence, these steps combine to form statistical scoring step 206. In this mode, the engine works on a given DD and decides which of the centroids is closer to the DD vector. The winner centroid is actually the category that the input document (from which the DD originated) belongs to.

In a centroid matching step 500, the engine calculates the similarity between each centroid and the vector that represents the input DD. The vector is created as described above. The similarity is calculated by $sim(v,C)=v \cdot C$ $$sim(v, C) = \frac{v \cdot C}{\|C\|}$$

(C-centroid, v-DD vector). The centroid that yields the higher similarity value is chosen to be the winner. The similarity results of the other centroids are calculated in order to establish the confidence of the declaration of the "winner" in step 502. If the results of the other centroids are closer to the result of the winner centroid, the decision is not taken with high confidence. What is actually calculated is the difference between the average of the other centroids results and the result of the winner centroids. The difference is then checked on a predefined scale to extract a correct confidence score in step 504.

The Rules Engine

Having performed the NL analysis, constructed the DD and obtained the category scores, one has a pretty good idea on the classification of the input document and on the meaning of the relevant parts of the text. Based on this knowledge, it is now possible to perform an additional phase of knowledge enhancement, based on rules that try to imitate the human way of drawing conclusions and making decisions. This is the task of the rule-based engine.

The rule-based engine operates on two major components: the rule base and the facts. The facts are actually the DD as well as the various category scores. The rule base is a set of rules, each composed of a set of conditions and a set of actions.

Figure 7:
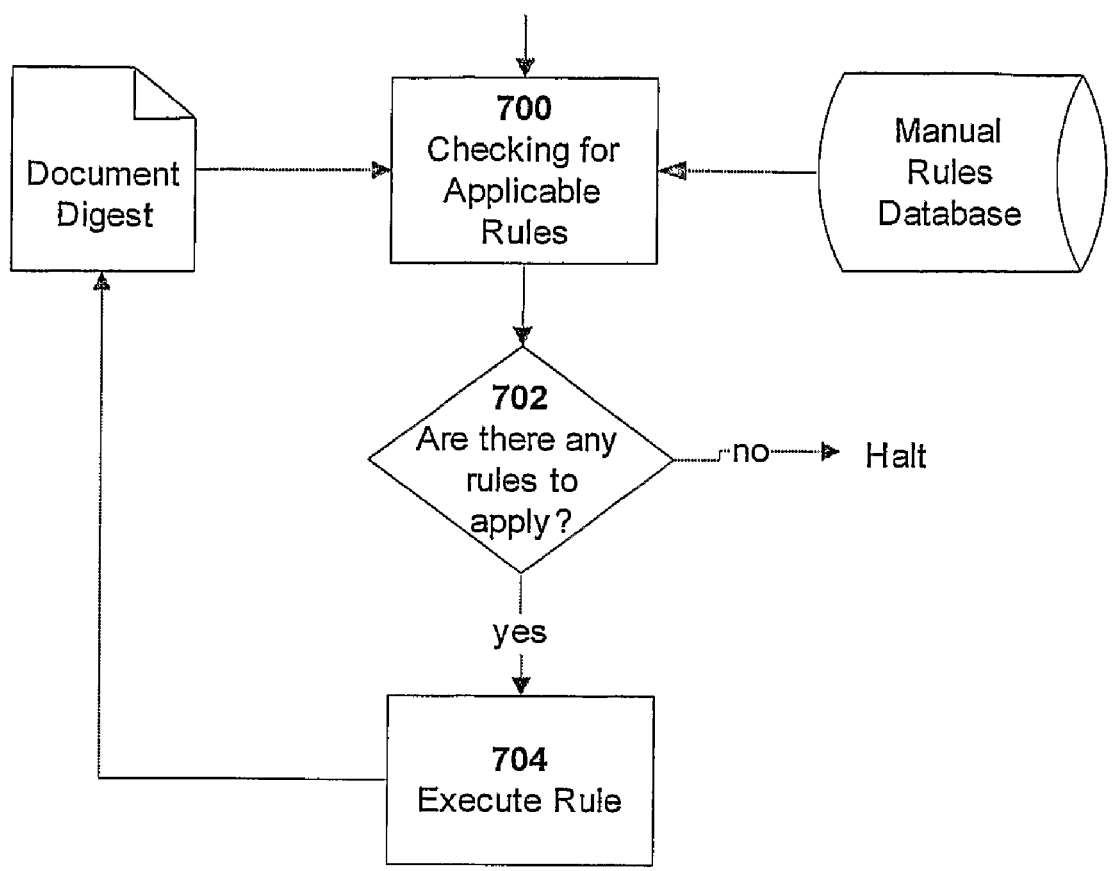
FIG. 7 shows the steps undertaken in the Rules Engine.

FIG. 7 shows the steps undertaken in the Rules Engine. In essence, these steps combine to form rules-aided DD refinement step 208. As mentioned, every rule includes a set of conditions and a set of actions. A condition can refer to the DD or to the array of category scores. If the conditions of the rules are satisfied, the rules are executed—namely to enrich the DD or even modify the category scores. The main cycle of the rule-based engine operation includes scanning the rule base in step 700 and looking for a rule whose conditions are satisfied in step 702. When such a rule is found it is executed in step 704—namely the actions in its action set are taken. These actions change the facts structure, so now new rules may be applicable. Note that once a rule has been applied, it is removed from the rule base. The engine keeps executing this main loop until it finishes a full scan of all the available rules without locating an applicable rule, or until it applies a final rule, which includes a halt action.

For example, suppose one wishes to detect that the text includes a Fatwa (a legal pronouncement in Islam, issued by a religious law specialist—a Mufti—on a specific issue, usually as an answer to a question raised by an individual). One option is that the word fatwA, which is mapped to the concept $Fatwa, occurs in the text. However, this is not the only option: if one has a high confidence that the text deals with Islamic religious subjects, and one detects the format of a question followed by an answer, one can determine that the text is a Fatwa with high confidence. One therefore defines the following rule, which is applied only on texts that have a high relevancy to religious matters, and if the concept $Question exists in the DD, followed by the concept $Answer. One also searches for an instance of the Mufti who issued the Fatwa:

```
<Rule id=1>
    <Conditions>
        <And>
            <Structure>
                <OntologyElement sem="$Question" />
                <OntologyElement sem="$Answer" />
            </Structure>
            <Score category="Religious" op=">="
                confidence="70%" />
            <Exist in="LocalInventory">
                <OntologyElement sem="$Mufti"/>
            </Exist>
        </And>
    </Conditions>
    <Actions>
        <Add to="LocalInventory">
            <OntologyElement sem="$Fatwa" />
        </Add>
        <Add to="$Fatwa"/>
            <AttributeValue attribute="@Mufti"
                value="$Mufti.name" />
        </Add>
        <Update>
            <Score category="Religious" op="="
                confidence="90%" />
        </Update>
    </Actions>
</Rule>
```

In this example, when the conditions are satisfied, the concept $Fatwa is added to the local inventory and the Mufti attribute defined by this concept is filled with a reference to the Mufti mentioned in the text. The score for the religious text category is also updated.

The condition elements used to define a rule are:
  Or: Defines a logical or between two—or more—internal elements (in our example, between the and element and the statistics element).
  And: Defines a logical and between two—or more—internal elements (in our example, between the structure element and the exists element).
  Structure: Defines condition on the structure of the document (in our example, one looks for a $Question that occurs before an $Answer element along the document).
  OntologyElement: Refers to an element from the local inventory or from the general ontology.
  Exists: Checks whether an element exists in the local inventory.

Score: Checks the score of a category using one of the comparison operators (in this case, one wants to check whether the score of the Fatwa category is 70% or above).

In the actions part one can define the following elements:

Add: Adding new elements of assigning slot values to some knowledge element (in this example, in the first add action the $Fatwa element is added to the local inventory, and in the second add action the Mufti attribute of the $Fatwa element just added is filled).

Update: Updating the score of a category using the specified assignment operator (in this case, the value of the score obtained for the Fatwa category is updated to be 90%).

Halt: Ordering the rule-based engine to halt.

Learning

The entire knowledge base serves as an evolving training (learning) set. The values in the knowledge base are adjusted as a result of input of new material. The new material may be:

a. Manually input documents
b. Automatically input documents which the system analyzes.

In the case of automatically input documents, the system operates on new documents as follows:

It analyzes all lexical elements in the document which appear in the lexicon and creates a DD. If the rule base characterizes the document as belonging to one of the predefined categories, the document is constantly compared with sets of documents that have been characterized in the same way.

When the system arrives at a given number of sets with the same category with a high level of common congruence, the common elements are tagged as potential indicators of that category. The more the elements appear in those types of documents, the stronger the indicator becomes.

The knowledge base also learns through synchronization with other operational systems and reiterated operation of the algorithm on the existing knowledge base in the light of new inputs. This is done through iteration of the process after updating of the system either manually or automatically as described above and by performing the process on the entire knowledge base, thus creating new potential indicators. These indicators may be textual or graphic.

The entire content of the knowledge base is indexed, so as to enable reference to either whole or partial documents, elements of the documents or combinations of documents which have been defined as having similarities.

Automatic Learning

Figure 8:
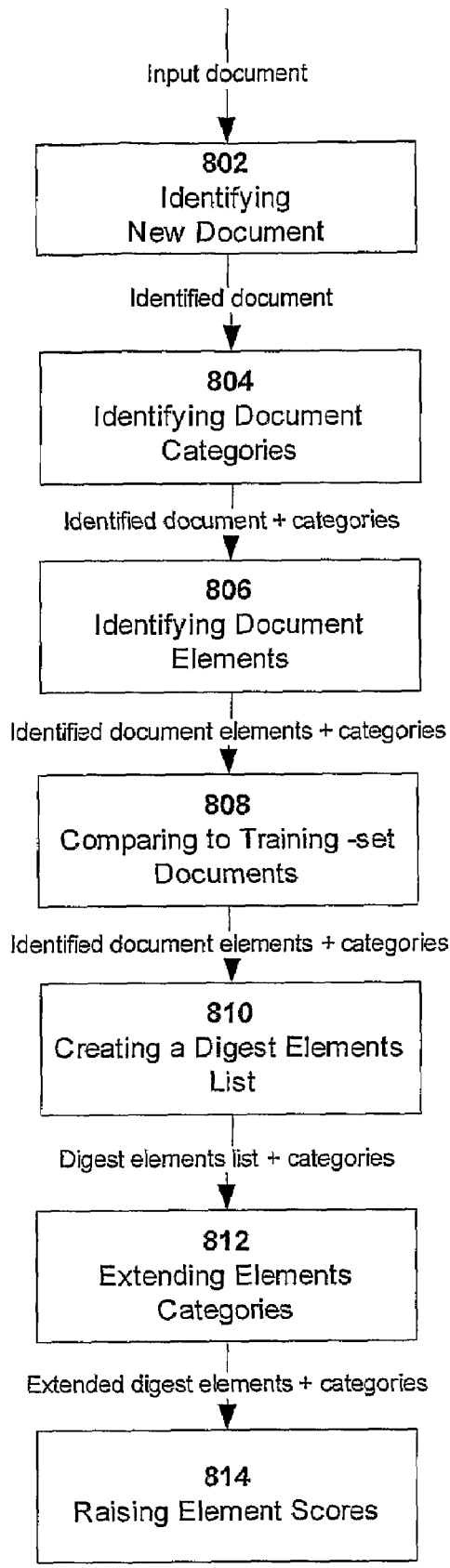
FIG. 8 shows the offline process of automatic learning.

The system includes elements for automatic expansion of the training set. This is an offline process, accomplished as follows, see FIG. 8:

Upon input of a new document that is not included in the learning set, the system identifies it according to criteria already existing as described above in step 802. If the document is identified as belonging to a certain ideological trend or category identified by the system in a check step 804, the system stores the elements of the document in step 806 in two ways: as those elements already represented in the lexicon and as lexical instances non-included in the lexicon. The system then compares the elements stored with those of other documents in the learning set that have been previously identified as belonging to the same category in step 808. Based on the results of that comparison, the system then creates a digest of elements (lexical instances) which appear with a high frequency in documents of that category but with significantly lower frequency in documents which do not belong to that category in step 810.

If the elements identified already appear in the ontology but are not tagged as leading to that category, they receive an automatic tagging which creates a leaning towards that category in step 812. This automatic learning process does not tag a document by itself as belonging to a given category but will be an added cause for categorization.

As the given elements appear in more documents which are identified as belonging to the same category, the system adds a score which raises the identification of that element as a prime identifier of that type of document in step 814.

EXAMPLE

The system reads a new document which is identified by various reasons as belonging to category A. The digest of the document shows that it has the phrase XYZ in it which is a phrase that appears in the lexicon but does not have an attribute of leading to that category. In addition, the document has various strings that do not lead to lexicon entries (BCD). The system runs XYZ through existing documents existing in the learning set and in the set of documents already scanned in that batch and checks if XYZ is frequent in documents of that category. The system checks if XYZ and BCD is equally frequent in documents of other categories. If the phrase is frequent in documents of the particular category but no in others, it is tagged as leading to that category. The more XYZ or BCD appears in the context of documents of such a category and not in others, the more the certainty that XYZ or BCD is an attribute of that category grows.

In summary, in essence, the present invention includes the following inventive features:

a. building a full Islam related knowledge base.
b. using a multi-engine architecture, i.e. combining statistical methods with a rule-based method.
c. using statistical methods but not the usual "bag of words' methodology used in the text categorization (TC) field. The ontology elements found in a document are treated as its 'features' instead of words.
d. using depth-intuitive rules to extract new information from the document.

All publications and patents mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for automatic real-time summarization and information extraction from one or more documents in a source language in order to present their content in a summary in a chosen target language and to input the content as categorized entities, the method comprising:

a. selecting said source language;
b. processing an input document into a textual format document while preserving visual information;
c. performing linguistic analysis based on models of a linguistic-register associated with the analyzed document;

d. extracting lexical instances corresponding to at least one of a pre-determined domain-specific lexicon and run-time lexical instances built according to pre-determined syntactic rules;

e. extracting ontology elements from the lexical instances to obtain a set of ontological instances comprising instances from a pre-determined ontology and refined ontological instances, said refined ontological instances comprising a combination of pre-determined ontological instances;

f. creating a document digest (DD) from the set of ontological instances, the DD being presented in a relationary map which retains information on features, context and linguistic origin of the components of the DD;

g. using domain-specific statistical models relating to categorization clusters and categories within said categorization clusters to determine the most likely categorization of the document in relation to a spectrum of categories by comparing the updated DD to each category model; wherein the step of using domain-specific models includes:
   i. creating a vector representing each DD using a pre-categorized corpus of domain-specific documents;
   ii. analyzing those documents to extract a model of a document digest which corresponds to or contradicts each category of document in the domain;
   iii. using statistical algorithms to create the models and creating mixed models of the different results which are specific to each category;
   iv. creating a mixed model of the results of analysis of each text;
   v. calculating a similarity result between each of a plurality of statistical models obtained offline of said categories and the vector generated by the DD of the input text and determining the most likely category in each cluster;
   vi. adding ontological instances to the DD based on the input of the categorization upon which rules from the rule base are applied; and
   vii. analyzing the winner model to extract a confidence score related to the DD;

h. creating in said target language a document summary for each of said one or more documents based on said DD and summarization rules.

2. The method of claim 1, wherein the step of identifying the source language is performed using linguistic features selected from the group consisting of an alphabet, unique or typical diacritics, frequency analysis of letter combinations and a combination thereof.

3. The method of claim 1, wherein the step of extraction of lexical instances includes:
   i. identifying sets of linguistic styles which constitute distinct linguistic registers;
   ii. linguistic tagging corpuses of texts corresponding to those registers;
   iii. building of statistical models for use in future linguistic analysis of text outside of the corpus;
   iv. using said statistical models to perform morphological and syntactic analysis on the input text to determine whether morphological variants of lexical instances in the lexicon which appear in the text are to be accepted as corresponding to those lexical entries.

4. The method of claim 1 wherein the step of extracting ontology elements includes linking lexical instances to ontological instances contained in a domain-specific ontology by performing one or more of the following:
   i. corresponding one lexical instance to more than one ontological instance;
   ii. a number of lexical instances generating together at least one ontological instance;
   iii. creating disambiguation of ontological instances by the same lexical instances is done by rules.

5. The method of claim 1 wherein the step of creating a document digest (DD) includes setting all ontological instances in relation to each other in a manner which corresponds to:
   i. their relative location in the source text; and
   ii. implicit semantic features which are expressed by their hierarchal place in the ontology and features represented by functional relations with other ontological instances.

6. The method of claim 1 further comprising, after step g:
   i. creating virtual ontological entities from the ontological instances in said set of ontological instances comprising determining their association to one or more ontological concepts, their features representing the contextual and implicit information which describes their nature and relationship with other entities and their linguistic representations and inputting them into a database;
   ii. matching virtual ontological entities to pre-existing ontological entities and saving separately matching and non-matching virtual ontological entities;
   iii. updating the DD with said ontological entities and virtual ontological entities to create an updated DD; and
   iv. repeating steps (i) to (iii) to generate new ontological instances based on the categorization of the document in step (i) and on application of categorization rules.

7. The method of claim 6 wherein the creation of said virtual entities is performed by:
   i. identifying named entities in the DD;
   ii. comparing the identified named entities to named entities in the ontology;
   iii. identifying possible relations between ontology instances and the named entities;
   iv. identifying named entities which are not in the ontology and determining their category or type based on contextual information and information implicit in the names;
   v. "reverse engineering" of transliterated names into the original source language determining the original form or possible forms of the entity, using the aggregated attributes of the entity to choose between alternative outputs or to provide confidence to them;
   vi. parsing the named entity and performs cultural-linguistic sensitive analysis of its components;
   vii. using the analysis of these components for further validation or reassessment of the categorization of the type of the entity;
   viii. filling the attribute slots of the virtual entity to provide further qualities for identification and matching;
   ix. aggregation of all the variants and aliases referring to an entity within the different inputs, while maintaining their source identity for possible regression;
   x. finding relations between identified entities; and
   xi. generation of a virtual "identity card" of an entity with all the aggregated information that is collected in the inputs about it.

8. The method of claim 1, wherein the creating said vector representing each DD includes:
   i. forming a vector in ontology elements space, wherein an i-th cell of the vector represents an ontology element through the value of a respective term frequency multiplied by an inverse document frequency;
   ii. normalizing the vector into a normalized vector, and iii. multiplying the normalized vector by a manually given score of the respective DD.

9. The method of claim 1 wherein the statistically scoring each DD to obtain a DD with associated category scores includes:
   i. creating a vector representing each DD;
   ii. calculating a similarity result between each of a plurality of centroids obtained offline and the vector and determining a winner centroid, and
   iii. analyzing the winner centroid to extract a confidence score related to the DD.

10. The method of claim 9, wherein the creating a vector representing each DD includes forming a vector in ontology elements space, wherein an i-th cell of the vector represents an ontology element through the value of a respective term frequency multiplied by an inverse document frequency, normalizing the vector into a normalized vector, and multiplying the normalized vector by a manually given score of the respective DD.

11. The method of claim 9, wherein the statistically scoring each DD based on predefined categories included in a knowledge base includes adjusting values in the knowledge base based on input of new materials.

12. The method of claim 11, wherein the adjusting is manual.

13. The method of claim 11, wherein the adjusting is automatic.

14. The method of claim 13, wherein the automatic adjusting includes automatic training.

* * * * *